April 4, 1961     C. O. GLASGOW     2,978,403
WATER SEPARATION MEANS FOR EMULSION TREATERS
Filed July 25, 1958
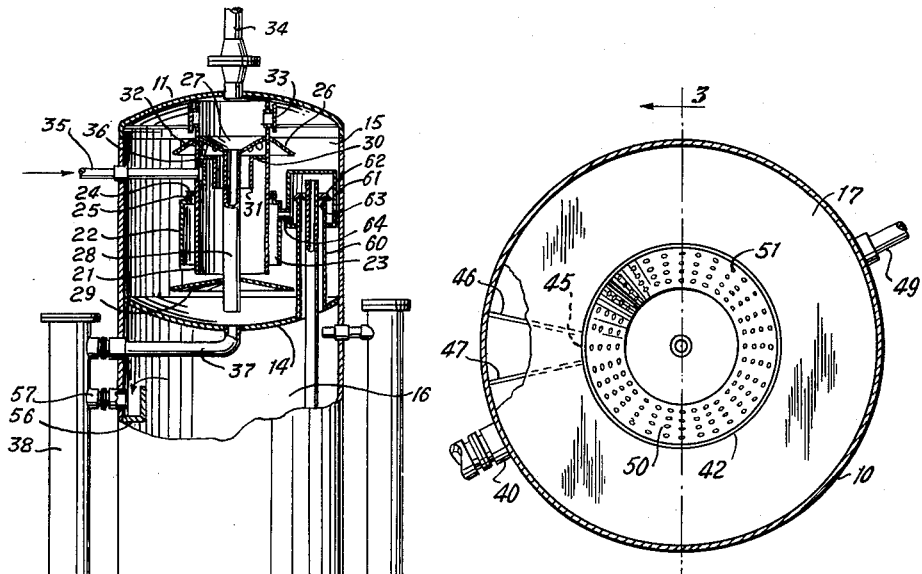
Fig. 2
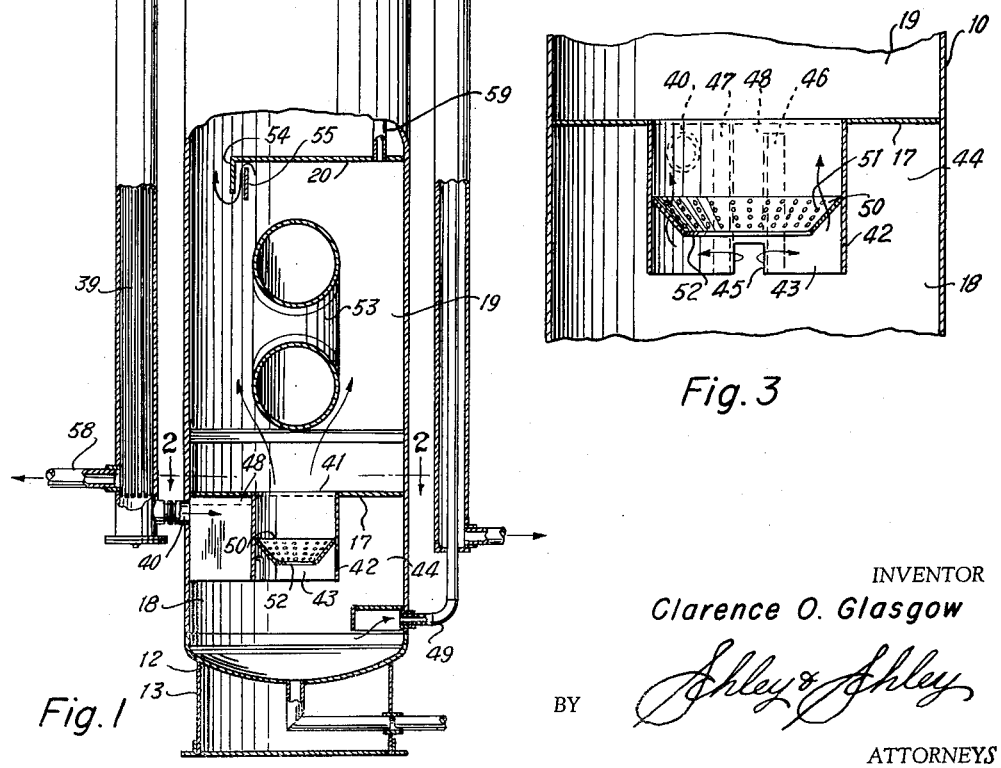
Fig. 3
Fig. 1
INVENTOR
Clarence O. Glasgow
BY Ashley & Ashley
ATTORNEYS

United States Patent Office 2,978,403
Patented Apr. 4, 1961

2,978,403

WATER SEPARATION MEANS FOR EMULSION TREATERS

Clarence O. Glasgow, Tulsa, Okla., assignor to National Tank Company, Tulsa, Okla., a corporation of Nevada Filed July 25, 1958, Ser. No. 750,987

13 Claims. (Cl. 208—187)

This invention relates to new and useful improvements in water separation means for emulsion treaters.

The invention is particularly directed to treaters employed in the petroleum industry for breaking and resolving emulsified well streams in which a portion or all of the oil is bound into an oil and water emulsion which must be separated into its water and clean oil components before the oil becomes salable. Such emulsified well streams normally contain gas, possibly some quantities of free water, and oil and water emulsions of varying degrees of "looseness," a term employed to designate the relative ease or difficulty with which the emulsion may be broken and resolved into its components. Conventionally, the breaking of the emulsified portions of the well stream involves the addition of emulsion breaking chemicals, as may be desired, followed by the heating of the well stream and the direction of the well stream into a settling and stratification zone wherein time is allowed for the heated emulsion to break and stratify into its water and clean oil components.

Prior to the final heating of an emulsified well stream for breaking of the emulsion, it is desirable to remove as much gas from the well stream as possible in order to reduce the volume thereof as well as to minimize subsequent turbulence in the heating section due to the evolution of gas, and it is also important to remove free water, as well as portions of the water bound in fairly loosely emulsified portions of the stream, again to reduce the volume of liquids being handled and also to reduce the volume of liquids which must be heated since nothing is to be gained by heating of this free water which may be separated prior to introduction of the well fluids into the heating chamber. The present invention is directed in particular to the removal of gas from the well stream, and most importantly, to the removal of the free water.

It has been the practice to introduce the well stream into a preliminary gas separation chamber in the upper portion of an emulsion treating enclosure and to withdraw separated liquids from the preliminary gas separation chamber, conducting them to a water removal or water knockout chamber in the lower portion of the emulsion treater enclosure from which water removal chamber, the remaining liquids flow upwardly into a heating chamber and a stratification chamber. Being adjacent the heating chamber, some degree of heat transfer may occur, and those liquids nearest the partition between the water removal chamber and the heating chamber may receive some preliminary heating, resulting in breaking or partial breaking of the looser portions of the emulsified components. Manifestly, the more complete the water removal and the more effective the transfer of heat, the greater the efficiency and treating capacity of the unit.

It is, therefore, an important object of this invention to provide emulsion treating methods and means in which the well stream is conducted through an amplified flow path for prolonged time of residence and more effective and complete removal of free water, as well as for the provision of a degree of preheating for aiding in removing greater quantities of water from the well stream prior to introduction of the later into the heating zone.

A further important object of the invention is to provide improved emulsion treating methods and means in which the well stream is conducted in an elongate circumferential or annular path for prolonged retention of the well stream in the water separation chamber for more effective water removal, as well as for stratification of the well stream into its lighter and heavier components, the lighter components, representing the clean oil and looser emulsified portions, inherently migrating toward the upper portion of the water removal chamber for reception of some degree of heat from the heating chamber and consequent resolution of some of the more loosely bound water and oil into their water and clean oil components.

Yet another object of the invention is to provide improved emulsion treating methods and means in which the well stream is passed in an elongate, smooth and continuously curved, turbulence-free path with the uppermost layers of the body of flowing fluids being preferentially withdrawn whereby the heavier emulsified portions, representing the more tightly bound oil and water emulsions, are retained in the water separation chamber for even greater lengths of time, offering amplified residence time for further water separation and possible emulsion breaking.

Yet another object of the invention is to provide improved emulsion treating means in which the liquids withdrawn from the water separation chamber are passed upwardly through a unique perforated spreading mechanism for dividing the fluids into a multiplicity of small upwardly-flowing streams and having provision for permitting the simultaneous downward movement of separated water while avoiding interference between the upwardly and downwardly moving streams.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a vertical view in elevation of an emulsion treater constructed in accordance with this invention and adapted to carry out the methods hereof, the upper and lower portions of the emulsion treater being broken away and shown in section to illustrate the structure, Fig. 2 is an enlarged, transverse, cross-sectional view taken upon the line 2—2 of Fig. 1, and Fig. 3 is a fragmentary, vertical, sectional view taken upon the line 3—3 of Fig. 2.

In the drawings, the numeral 10 designates an upright cylindrical emulsion-treating vessel having its upper end closed by a domed head 11 and its lower end closed by a dished bottom 12 carried upon a suitable support 13. A downwardly concave partition 14 positioned interiorly of the vessel 10 and near the upper end thereof encloses with the head 11 a preliminary gas separation chamber 15, and forms the upper wall of a stratification chamber 16 in the intermediate portion of the vessel. Similarly, a partition 17 disposed interiorly of the vessel 10 and near the lower end thereof, encloses with the bottom 12 a water separation or water knockout chamber 18, and forms the lower wall of a heating chamber or compartment 19 disposed within the vessel below the stratification chamber 16. Further, a partial partition 20 extends across the interior of the vessel 10 at a point spaced well above the partition 17 to form a partial enclosure or upper wall for the heating chamber 19 and to define the lower limits of the stratification chamber 16. Thus, the vessel is divided broadly from its upper end to its lower end into the gas separation chamber 15, the stratification and settling chamber 16, the heating chamber 19, and the water separation chamber 18.

Within the preliminary gas separation chamber 15, there is provided a central cylindrical shell 21 depending from the head 11 and having its open lower end spaced above the partition 14. A second cylindrical shell 22 surrounds the lower portion of the shell 21 to define an annular space 23 therebetween, the lower end of the shell 22 being open to the chamber 15, while the upper end 24 of the shell 22 is reduced in diameter and joined to the outer surface of the shell 21 to close the upper end of the annulus 23. A plurality of radial perforations 25 formed in the reduced upper portion 24 of the shell 22 establish communication between the upper portion of the annulus 23 and the interior of the chamber 15. Above the shell 22, the shell 21 carries a downwardly and outwardly extending annular flange 26, and a corresponding downwardly and inwardly inclined conical partition 27 is provided interiorly of the shell 21 in substantially horizontal alinement with the flange 26. A drain conductor 28 opens through the central portion of the partition 27 and extends downwardly through the shell 21 to a point spaced closely above the partition 14, there being provided a downwardly and outwardly inclined conical baffle 29 mounted upon the lower portion of the conductor 28 below the lower end of the shell 21 and projecting outwardly past the peripheries of the shells 21 and 22. The shell 21 also carries an internal, inwardly-directed flange 30 below the partition 27 having a short downwardly-extending skirt 31 surrounding but spaced from the conductor 28. A plurality of radial openings 32 are provided in the wall of the shell 21 between the partition 27 and the flange 30. Further, a plurality of tangential or circumferential gas inlet diverters 33 open radially from the chamber 15 into the upper portion of the shell 21 above the flange 26 and partition 27. A gas outlet pipe 34 extends through the head 11 from the interior of the shell 21 above the inlet diverters 33.

A well stream or emulsion stream inlet conductor 35 extends radially through the wall of the chamber 15 and the wall of the shell 21 between the shell 22 and the flange 26, and opens into the interior of the shell 21 through a diverter box 36 which imparts a tangential or circumferential path of flow to the incoming stream whereby the stream is caused to spread in a thin film and flow circumferentially about the interior wall of the shell 21. This spreading of the well stream into a thin film and the scrubbing of the well stream upon the interior wall of the shell 21 results in the evolution and separation of much of the free gas present in the well stream as the stream passes downwardly through the shell 21 and impinges upon the upper surface of the baffle 29. At the latter point, the well stream is caused to undergo a change of direction and is again spread into a thin film flowing over the upper surface of the baffle 29 before cascading onto the upper surface of the partition 14. With the several changes of direction and repeated springs of the well stream into thin films, as well as by reason of the scrubbing carried out upon the various surfaces contacted by the well stream, very effective removal of gas from the stream is realized, and effective degasification of the emulsified liquids is carried out. The gas separated within the interior of the shell 21 must flow downwardly and under the lower edge of the skirt 31 before flowing upwardly into the space beneath the partition 27 and outwardly through the openings 32. In this reversal of direction, effective separation of liquid droplets from the gas is obtained, and further, as the gas flows outwardly through the openings 32 and downwardly to escape from beneath the lower edge of the flange 26, a further scrubbing of the gas on the underside of the flange 26 as well as a further reversal of direction of travel takes place so that the gas entering the diverter units 33 has been reasonably well denuded of liquid particles.

Upon entering the space within the shell 21 and above the partition 27 through the tangential inlets 33, the gas is caused to assume a circumferential path of travel about the interior of the upper portion of the shell 21, thus scrubbing the last remaining liquid droplets from the gas before the latter passes into the outlet conductor 34, the liquids scrubbed from this gas then flowing downwardly onto the partition 27 and through the conductor 28 to the partition 14.

The separated liquids drain from the preliminary gas separation chamber through a conductor 37 opening downwardly from the central portion of the partition 14 and extending laterally through the side wall of the vessel 10 into the upper end and tube side of a tube and shell heat exchanger 38 positioned vertically and exteriorly of the emulsion treating vessel. The liquids pass downwardly through the tubes 39 of the heat exchanger to the lower end thereof and are discharged through a lateral conductor 40 opening into the water separation chamber 18 below the partition 17. As will be pointed out more fully hereinafter, the warm clean oil separated by the treater from the well fluids is passed through the shell side of the heat exchanger 38 and thus is brought into heat exchange relationship with the well fluids flowing downwardly from the chamber 15 in order to cool the clean oil as well as impart a degree of preheating to the separated well liquids.

The partition 17 is provided with a central opening 41 from which a cylindrical skirt 42 depends into the chamber or inverted weir 45 is cut or otherwise formed in the ber 18 to define an axial flow space 43 and a circumferential or annular water separating space 44. A notch lower edge or lower portion of the skirt 42 adjacent the point of entry of the conductor 40 into the annulus 44, and a vertical partition 46 extends radially of the annulus 44 between the inner wall of the vessel 10 and the outer wall of the skirt 42, the partition 46 adjoining one lateral margin of the notch 45 and extending from the lower end of the skirt 42 to a point adjacent but spaced from the underside of the partition 17, as shown in Fig. 3. A second vertical partition 47 adjoins the opposite lateral margin of the notch 45, extending radially between the inner wall of the vessel 10 and the outer wall of the skirt 42, and extending vertically from the lower edge of the skirt 42 to the underside of the partition 17 so as to close off completely the annulus 44. The partition 47 is disposed between the notch 45 and the inlet conductor 40, and hence, the liquids entering the annulus 44 from the conductor 40 are caused to flow completely around the annulus 44 before reaching the space 48 between the upper edge of the partition 46 and the partition 17 to flow downwardly through the channel between the partitions 46 and 47 and outwardly through the notch 45 into the flow space 43.

The lower portions of emulsion treaters are normally filled with water or other liquids, and it is clear that of those liquids present beneath the partition 17, the lightest liquids will display the greatest tendency to flow upwardly into the heating chamber 19. The space between the partitions 46 and 47 will be filled at all times with such lighter liquids, and there will be no tendency for such liquids to escape directly beneath the lower edge of the skirt 42, and obviously, no tendency for any heavier liquids to flow upwardly in opposition to the upward flow of such lighter liquids. Thus, as the well fluids enter the annulus 44 from the conductor 40, they will immediately begin to separate and stratify, the free water preferentially moving toward the lower portion of the chamber 18, while any clean or relatively free oil will move upwardly into direct contact with the underside of the partition 17, and heavier oil-water mixtures will seek a level between the upper and lower portions of the chamber 18. As will appear more fully hereinafter, the partition 17 receives some degree of warming or heat from the chamber 19, and this heat will be transferred to the lighter emulsions which are more readily broken by the application of moderate quantities of heat so that such lighter emulsions will display a marked tendency to separate into water and clean oil, the clean oil passing through the notch 45 and upwardly through the flow space 43, while the water settles to the lower portion of the chamber 18. In flowing completely and circumferentially around the annulus 44, and being spread into a relatively thin layer beneath the partition 17, the looser or lighter emulsions will not only have ample opportunity for reception of heat through the partition 17, but will also be provided with an extended period of residence within the annulus 44 to realize to a maximum degree the emulsion resolving or breaking capacities of this water knockout chamber. More importantly, the emulsion stream will be carried through a prolonged and greatly amplified path of travel which provides enhanced opportunities for settling of water, especially free water, from the emulsion, so that when the latter passes upwardly to the heating chamber 19, a most effective and efficient water separation step will have been carried out. Of course, all of the emulsified components ultimately travel upwardly through the flow space 43, but it is noted that preferential withdrawal is made of the lighter well stream components, and that, as the heavier components or more tightly bound emulsions move upwardly toward the partition 17, they will receive increased preheating from the partition 17, thus reducing their viscosity and density, facilitating the settling of water, sand, and other heavier materials therefrom and assuring the delivery to the heating chamber of the emulsified portions in optimum condition for further heating and emulsion breaking.

In previous types of emulsion treaters having a water separation chamber or a water knockout compartment in their lower portions, there has been provided only transverse or back-and-forth flow of the well stream across the compartment, and the advantages and importance of the circumferential flow provided by the present invention cannot be overemphasized. Quite clearly, the greater the length of the path of travel of the well stream through the water separation compartment as well as the longer the period of residence of the well stream within the compartment, the more thorough and complete will be the separation of free water, sand, and other heavier components from the well fluids before they enter the heating step. This not only contributes to more effective emulsion treating, but also greatly reduces the load placed upon the heating section as well as preventing the contamination thereof with sand or other solid particles which may be present in the well stream.

In the present invention, the efficient removal of water from the emulsified stream is facilitated and enhanced by the smooth, turbulence-free flow which obtains in the continuously curved flow path defined by the annulus 44. An elongate path of travel is provided, and yet this is accomplished without any reversal or abrupt change in direction in said flow path. Thus, turbulence is eliminated so that the liquids entering the water separation zone may begin stratification immediately and continue in their flow around the inner periphery of the zone with such stratification undisturbed. The flow-directing surfaces are two smooth, concentric cylinders which supply the elongate flow path and prolonged period of residence, but which also provide, in a limited space, a minimum of agitation or turbulence in the flow. Once the liquids have commenced to stratify, there are absent any physical elements or any physical forces tending to disturb the strata whereby stratification would have to recommence with a partial loss of the benefits of long flow and long time of residence. Therefore, the lighter liquids are maintained constantly adjacent the underside of the partition 17, any tendency for water to reenter the oil layers is done away with, and preferential withdrawal of the lighter liquids is insured.

The separated water is withdrawn from the lower portion of the chamber 18 through a conventional water leg structure 49, while the remaining liquids, including free or clean oil and emulsified oil, pass upwardly through the interior of the skirt 42. The free water which is removed will be substantially free of added heat, thus minimizing the loss of heat from the treater in such removed water, while the heat received by the emulsified portions of the well stream will be carried by those portions into the heating chamber 19 and thus returned thereto for maximum heat conservation.

Within the skirt 42, there is provided a downwardly-directed conical flange 50 which is provided with a multiplicity of spaced perforations 51 or is otherwise suitably formed as a foraminous member having a multiplicity of flow openings extending therethrough. The flange 50 is annular in shape, having a large central opening 52 and adjoining the inner wall of the skirt 42 to form an annular pocket or trap into which the well stream fluids are directed from the notch 45. Being trapped beneath the flange 50, the fluids are distributed circumferentially therebeneath and flow upwardly through the openings 51 in a multiplicity of small divided streams into contact with or proximity to a suitable heating element 53 disposed within the heating chamber 19 and which may be a conventional fire tube, an indirectly heated fire tube, a steam heater, or any other suitable heating means. Within the heating chamber 19, the well fluids are brought to their maximum temperature and then flow upwardly into engagement with the underside of the partition 20. At this point, breaking and resolution of the emulsified portions is continued, the separated free water flowing downwardly through the central portion of the skirt 42 and through the central opening 52 of the flange 50 so as not to impede or interfere with the upward flow of the emulsified portions of the well stream passing upwardly from the opening 51. Thus, the downward flow of the water is directed toward the central or axial portion of the passage 43 while the upward flow of the emulsion fluids is directed to the outer or circumferential portions of the passage.

The partition 20 is provided on its free edge with a depending lip 54 for impeding the escape of the heated emulsion fluids from therebeneath, there being provided a transverse baffle 55 extending in parallel and spaced relationship to the lip 54 and being positioned beneath the partition 20 on the inward side of the lip 54. Thus, as indicated by the flow designating arrow of Fig. 1, the lighter liquids and clean oil are preferentially withdrawn from immediately beneath the partition 20, flowing over the upper edge of the baffle 55 and under the lower edge of the lip 54 to escape upwardly into the settling and stratification chamber 16. The heavier liquids are retained within the heating chamber 19 for greater lengths of time, and, as a result of the heating thereof, such liquids begin to break into water and clean oil, the oil moving upwardly to escape from beneath the lip 54 while the water moves downwardly through the opening 52 into the chamber 18. Within the chamber 16, the separation and stratification of the water and clean oil continues, the water passing downwardly through the chamber 19 into the chamber 18, while the clean oil moves upwardly and is discharged through an overflow or weir box 56 into a conductor 57 opening into the upper end of the shell side of the heat exchanger 38. A cooled, clean oil outlet 58 leads from the lower end of the shell side of the heat exchanger for delivery of cool clean oil to storage vessels or other points of clean oil accumulation.

Since the well stream receives its greatest heating in the chamber 19, the greatest evolution of gas may be expected at that point. In order to prevent such gas from passing upwardly into the chamber 16 to create turbulence and impair the quiet settling conditions which are most desirable, a gas vent pipe 59 is provided leading upwardly from the partition 20 through a riser pipe 60 which projects upwardly from the partition 14 into the chamber 15 and terminates within a scrubber box 61. An annular ring 62 of V-shaped cross-section adjoins the upper portion of the pipe 60 and is mounted in an inverted position upon the upper end of the riser pipe 60. A plurality of radial openings 63 are formed in the upper extremity of the riser 60 immediately beneath the ring 62 and within the box 61. Thus, gas evolved beneath the partition 14 may flow upwardly through the pipe 60 and outwardly through the openings 63 into the box 61, while gas evolved beneath the partition 20 is carried upwardly through the pipe 59 into the upper portion of the box 61. A short conductor 64 extends from the lower portion of the box 61 into the interior of the shell 22 for conducting gas and separated liquids from the box into the shell for scrubbing upon the walls of the shells 21 and 22 by passage through the annular space 23, such scrubbing and separation being, of course, in addition to that received within the box 61.

The invention is not to be limited for utilization in vertical vessels although it is most adaptable to this form of emulsion treater, and it is to be noted that various additional elements may be included in the structure such as additional vapor condensers, filter sections within the chamber 16, preheaters, and other emulsion treater equipment.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of removing water from emulsified petroleum well streams including, flowing the emulsified stream at a relatively cool temperature through a preliminary gas separation and condensing zone, flowing the emulsified stream from the condensing zone to a heating zone and therein heating the emulsified stream to a temperature sufficient to resolve the emulsion into its oil and water components, withdrawing clean oil and water, flowing the clean oil into a settling zone, trapping vapors evolved in the heating zone, conducting the trapped vapors along with vapors evolved from the hot clean oil upwardly and out of contact with the settling zone and into the condensing zone and therein passing said vapors in direct heat exchange with the emulsified stream for condensation of water and hydrocarbon vapors and admixture of the condensed vapors with the emulsified stream whereby commingling of the condensed water vapors with the hot clean oil is avoided.

2. The method as set forth in claim 1, and returning the condensing vapors to the heating step for further stabilization and resolution.

3. In an emulsion treater for emulsified petroleum well streams, water separation means including, a vessel, a partition in the vessel forming a preliminary gas separation and condensing chamber, means for admitting an emulsified stream to the condensing chamber, heating means carried by the vessel, means for flowing the emulsified stream from the condensing chamber in heating relationship with the heating means to resolve the emulsified stream into its oil and water components, a settling chamber, means for withdrawing water and clean oil, means for flowing the clean oil into the settling chamber, means for trapping vapors evolved in the heating of the emulsified stream, means for conducting the trapped vapors along with vapors evolved from the hot clean oil upwardly and out of contact with the settling chamber and into the condensing chamber in direct heat exchange relationship with the emulsified stream being admitted to the condensing chamber, and means for withdrawing gas and uncondensed vapors.

4. Water separation means as set forth in claim 3, and means for conducting condensed vapors from the condensing chamber to the heating means for further stabilization and resolution.

5. The method of removing water from emulsified petroleum well streams including the steps in sequence of, flowing the emulsified well stream into a gas separation zone, flowing the emulsified stream in an elongate circumferential path in a water separation zone to permit water to settle from the stream, withdrawing water from the water separation zone, withdrawing the balance of the emulsified stream together with any separated clean oil from the water separation zone and flowing the same into a heating zone.

6. The method of removing water from emulsified petroleum well streams including the steps in sequence of, flowing the emulsified well stream into a gas separation zone, flowing the emulsified stream in an elongate annular path in a water separation zone to permit water to settle from the stream, withdrawing water from the water separation zone, withdrawing the balance of the emulsified stream together with any separated clean oil from the water separation zone and flowing the same into a heating zone.

7. The method of removing water from emulsified petroleum well streams including the steps in sequence of, flowing the emulsified stream into a gas separation zone, flowing the emulsified stream in an elongate circumferential path in a water separation zone to permit water to settle from the emulsified stream, withdrawing the balance of the emulsified stream together with any separated clean oil from the water separation zone, flowing the balance of the emulsified stream and separated clean oil into a heating zone, heating the balance of the emulsified stream and separated clean oil in the heating zone, and withdrawing water from the water separation zone and clean oil from the heating zone.

8. The method of removing water from emulsified petroleum well streams including the steps in sequence of, flowing the emulsified stream into a gas separation zone, flowing the emulsified stream in an elongate smooth continuously curved path in a water separation zone to permit water to settle from the emulsified stream, withdrawing the balance of the emulsified stream together with any separated clean oil from the water separation zone, flowing the balance of the emulsified stream and separated clean oil into a heating zone, heating the balance of the emulsified stream and separated clean oil in the heating zone, and withdrawing water from the water separation zone and clean oil from the heating zone.

9. An emulsion treater for emulsified petroleum well streams comprising, an upper gas separation chamber, water separation means including spaced concentric walls forming a lower annular water separation chamber, a heating chamber, means for conducting the emulsified stream from said gas separation chamber to said water separation chamber, means for causing the emulsified stream to flow in a path extending circumferentially through said water separation chamber, means for discharging water from said water separation chamber, and means for discharging the balance of the emulsified stream together with any separated clean oil from said water separation chamber into said heating chamber.

10. An emulsion treater for emulsified petroleum well streams comprising an annular vessel, an upper gas separation chamber in said vessel, an intermediate heating chamber in said vessel, a lower water separation chamber, a transverse partition in said vessel positioned between said heating chamber and said water separation chamber and forming the upper wall of said water separation chamber, an annular sleeve depending into said water separation chamber from said partition and spaced from the inner wall of said vessel and opening upwardly into said heating chamber, means including an inlet into said water separation chamber for conducting the emulsified stream from said gas separation chamber into said water separation chamber externally of said sleeve, a second partition in said vessel extending between the inner wall of said vessel and the outer wall of said sleeve and positioned adjacent said inlet whereby the emulsified stream flows in an elongate path extending circumferentially through said water separation chamber and around said sleeve, outlet means for the stream from said water separation chamber to the interior of said sleeve on the opposite side of said second partition into said heating chamber, means for discharging water from said water separation chamber and means for discharging clean oil from said heating chamber.

11. Water separation means as set forth in claim 10, and a foraminous baffle in the sleeve above the outlet means.

12. Water separation means as set forth in claim 10, and an annular downwardly-inclined foraminous flange in the sleeve above the outlet means.

13. Water separation means as set forth in claim 10, and a third partition extending between the inner wall of the vessel and the outer wall of the sleeve, the third partition being disposed between the second partition and the outlet means and having its upper edge spaced below the transverse partition.

References Cited in the file of this patent

UNITED STATES PATENTS

| | | |
|---|---|---|
| 2,181,685 | Walker | Nov. 28, 1939 |
| 2,181,688 | Walker | Nov. 28, 1939 |

UNITED STATES PATENT OFFICE

CERTIFICATE OF CORRECTION

Patent No. 2,978,403  April 4, 1961

Clarence O. Glasgow

It is hereby certified that error appears in the above numbered patent requiring correction and that the said Letters Patent should read as corrected below.

Column 7, line 22, after "box 61." add the sentence -- Indirect heat exchange takes place between the gas and separated liquids from box 61 and the emulsion stream spread upon the interior wall of shell 21. --; lines 51 and 74, for "direct", each occurrence, read -- indirect --.

Signed and sealed this 19th day of June 1962.

(SEAL)
Attest:

ERNEST W. SWIDER
Attesting Officer

DAVID L. LADD
Commissioner of Patents